United States Patent Office.

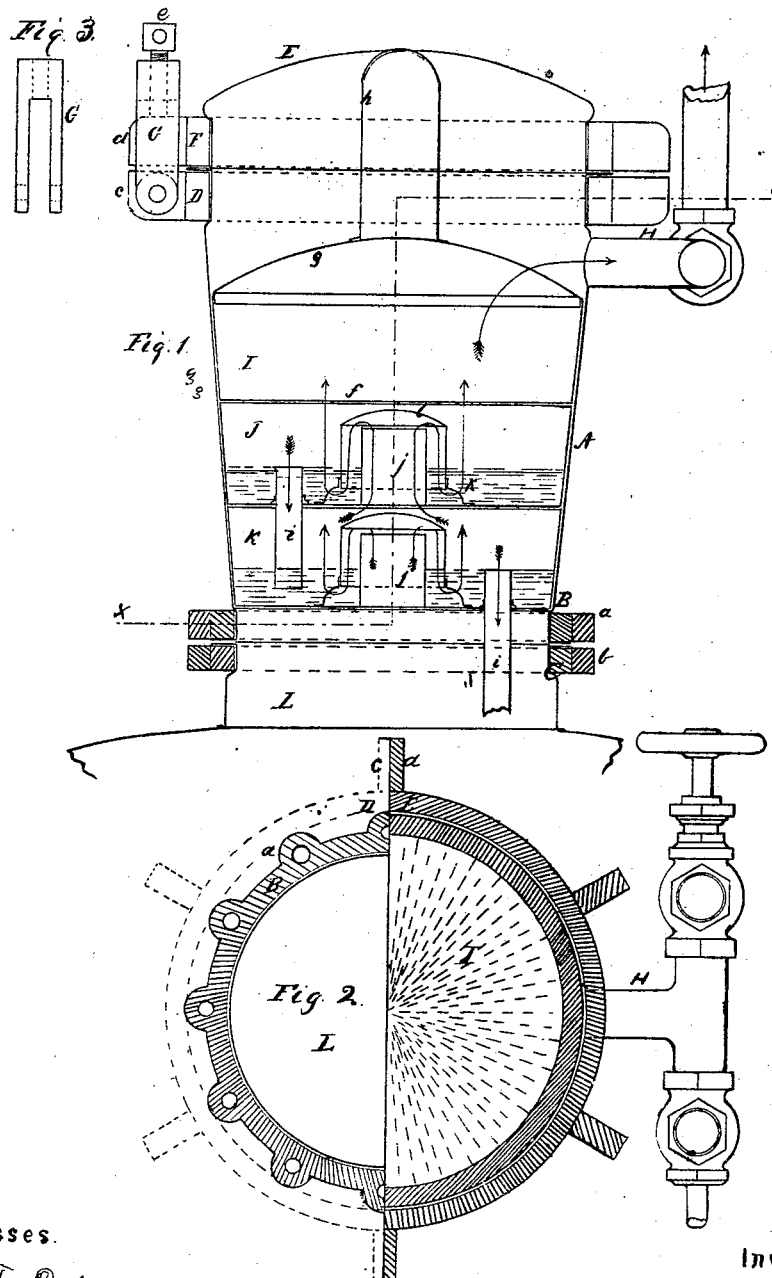

LUDWIG WOLFF, OF CHICAGO, ILLINOIS.

Letters Patent No. 92,685, dated July 13, 1869.

IMPROVED APPARATUS FOR RECTIFYING AND FLAVORING SPIRITS.

The Schedule referred to in these Letters Patent and making part of the same.

*To all whom it may concern:*

Be it known that I, LUDWIG WOLFF, of Chicago, in the county of Cook, and State of Illinois, have invented certain new and useful Improvements in Devices for Flavoring and Refining Spirits; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to "stills;" and consists in the construction and attachment to the top of a still of a taper column, provided with one or more perforated baskets to hold seed, leaves, or other similar material, for flavoring the liquor, and with devices for rectifying it, if desired.

In the drawings—

Figure 1 is a longitudinal vertical section;

Figure 2 is a transverse section on the red line $x$–$x$ of fig. 1; and

Figure 3 is a side view of a part detached.

In constructing my device, I make a taper hollow column, A, out of any suitable material, and of any size desired, and provide its lower end with a flange, B, having lugs $a$, by which to attach it to the top of a still, L, having a corresponding flange, C, with lugs $b$, for that purpose, as clearly shown in figs. 1 and 2.

The top of the taper column A, I also provide with a flange, D, with lugs $c$, for connecting a cover, E, having a flange, F, with lugs $d$, for that purpose. This I do by pivoting a stirrup, G, shaped as shown in fig. 3, to each of the lugs $c$, and having its upper end provided with a set-screw, $e$, to lock the lugs together, as clearly shown in fig. 1.

In the upper end of the column, I place a branch pipe, H, with one branch leading to another similar taper column, for further flavoring and rectifying the liquor, and the other to a worm, as may be desired, by opening or closing a valve properly arranged for the purpose.

Inside of the column A, I place or set loosely three baskets, I, J, and K, one above the other, so that they can be easily taken out and replaced, or others put in their stead.

The upper basket I is made with a perforated bottom, $f$, and a perforated convex cover, $g$, with a handle, $h$.

The baskets J and K are made with tight bottoms, in which is inserted a short pipe, $i$, projecting above and below them, as shown in fig. 1, and also with larger pipes $j$, projecting upward, over which are supported, by braces $k$, concave caps $l$, shaped and placed relatively to the pipes $j$, as clearly shown in the same figure.

In operating my device, I attach it first to the top of the still, and then put in the baskets J and K, having first filled them with whiskey or other liquor, far enough to cover the lower ends of the covers $l$. After this, I put in the basket I, having previously filled it with seeds, leaves, or other materials possessing the requisite qualities to impart the desired flavor to the liquor that, in the form of vapor, passes through it.

I then put on the cover E, placing suitable packing between the flanges D and F, and secure it in place by the stirrups G and set-screws $e$.

The still can now be started, when the vapors will pass up through the baskets K, J, and I, as indicated by the red arrows in fig. 1. As it passes through the baskets K and J it will be partially rectified, and when the quantity condensed fills the baskets above the tops of the pipes $i$, it will flow back in the direction indicated by the blue arrows.

The vapor that is not condensed will pass on through the materials in the perforated basket I, and have the desired flavor imparted to it, and then on through the branch pipe H, and may then be conducted through another similar hollow column, or to the worm of the still, as desired.

It is obvious that the baskets can be easily removed and others substituted, if desired, and that, instead of using one flavoring-basket and two rectifying ones, that a different number of each may be used, or that all the baskets may be constructed so as to be used for flavoring-purposes.

It is further obvious that my device may be used in flavoring or flavoring and refining different kinds of spirits.

Having thus described my invention,

What I claim, is—

1. A device for flavoring spirits, consisting of a hollow column or cylinder, A, provided with a closely-fitting cover, E, and one or more perforated baskets I, when constructed and arranged to be operated in connection with a still, substantially as herein described.

2. A device for flavoring and refining spirits, consisting of a hollow column or cylinder, A, provided with a closely-fitting cover, E, and one or more perforated baskets I, and one or more rectifying-baskets J, when constructed and arranged to be operated, in connection with a still, substantially as herein described.

LUDWIG WOLFF.

Witnesses:
WM. H. LOTZ,
FR. W. WOLF.